United States Patent
Kuo et al.

(10) Patent No.: US 7,719,211 B2
(45) Date of Patent: May 18, 2010

(54) LAMP CURRENT BALANCING TOPOLOGIES

(75) Inventors: Ching Chuan Kuo, Junghe (TW); Houng Kuo Hsu, Taoyuan (TW)

(73) Assignee: O2Micro International Limited, Grand Cayman (KY)

( * ) Notice: Subject to any disclaimer, the term of this patent is extended or adjusted under 35 U.S.C. 154(b) by 170 days.

(21) Appl. No.: 12/119,770

(22) Filed: May 13, 2008

(65) Prior Publication Data
US 2008/0211426 A1    Sep. 4, 2008

Related U.S. Application Data
(63) Continuation of application No. 11/253,918, filed on Oct. 19, 2005, now Pat. No. 7,372,213.

(51) Int. Cl.
*H05B 37/02* (2006.01)
(52) U.S. Cl. ............ 315/308; 315/277; 315/282; 315/324
(58) Field of Classification Search ........ 315/209 R, 315/210, 219, 220, 224–226, 244, 246, 277, 315/282, 291, 299–301, 307, 308, 312, 324
See application file for complete search history.

(56) References Cited

U.S. PATENT DOCUMENTS

| | | | |
|---|---|---|---|
| 6,121,734 A * | 9/2000 | Szabados | ............ 315/291 |
| 6,534,934 B1 | 3/2003 | Lin | |
| 6,538,395 B2 * | 3/2003 | Szabados | ............ 315/291 |
| 7,166,969 B2 * | 1/2007 | Kohno | ......... 315/209 PZ |
| 7,242,147 B2 * | 7/2007 | Jin | ............ 315/177 |
| 7,294,971 B2 * | 11/2007 | Jin | ............ 315/177 |
| 7,391,166 B2 * | 6/2008 | Ushijima et al. | ...... 315/276 |
| 7,560,875 B2 * | 7/2009 | Jin | ............ 315/277 |
| 7,589,478 B2 * | 9/2009 | Ushijima et al. | ...... 315/277 |

OTHER PUBLICATIONS

English language translation of Taiwanese Office Action issued in related Taiwan Patent Application No. 095136119 (3 pages).

* cited by examiner

*Primary Examiner*—Thuy Vinh Tran
(74) *Attorney, Agent, or Firm*—Grossman, Tucker, Perreault & Pfleger, PLLC

(57) ABSTRACT

A method according to one embodiment may include generating AC voltage and current and a striking voltage. The method of this embodiment may also include generating striking voltage and steady-state voltage for at least two lamp loads. The method of this embodiment may also include coupling at least two lamp loads in parallel. The method of this embodiment may also include coupling current balancing circuitry to the at least two lamp loads and providing, by the current balancing circuitry simultaneous striking voltage to the at least two lamps loads. The method of this embodiment may also include balancing, by the current balancing circuitry, AC current through the at least two lamp loads. Of course, many alternatives, variations, and modifications are possible without departing from this embodiment.

16 Claims, 4 Drawing Sheets

LAMP CURRENT BALANCING TOPOLOGIES

CROSS REFERENCE TO RELATED APPLICATIONS

This application is a continuation of U.S. application Ser. No. 11/253,918 filed on Oct. 19, 2005, now U.S. Pat. No. 7,372,213, the teachings of which are herein incorporated by reference.

FIELD

The present disclosure relates to lamp current balancing topologies.

BACKGROUND

In conventional circuits driving multiple lamps, there are two primary configurations. Both configurations may include an inverter controller capable of receiving feedback and fault protection signals, switches, ballast and resonant capacitors to amplify the signal, multiple lamps to be driven by the amplified signal and fault protection circuitry to generate the fault protection signal. The first configuration drives the lamps with a single transformer. In the conventional arrangement, when the lamps are driven by a single transformer, the current flowing through each individual lamp is not balanced, creating difficulties in acquiring a reliable feedback signal. An unreliable feedback signal may allow some of the lamps to stay off during the ignition process and may present safety issues. The second configuration drives each lamp with a dedicated transformer. Driving each lamp individually solves the feedback issue, but introduces a new component which increases cost of production and requires physical space in the device. Therefore, an inexpensive way to drive multiple lamps while maintaining a reliable feedback signal is needed.

SUMMARY

One system embodiment described herein may provide a transformer capable of generating, at least in part, AC voltage and current and a striking voltage. The system may also include at least two lamp loads coupled in parallel to the transformer. The system may also include current balancing circuitry coupled to the plurality of lamp loads, the current balancing circuitry is capable of balancing AC current supplied by the transformer through the at least two lamp loads, the current balancing circuitry is also capable providing simultaneous striking voltage, supplied by the transformer, to the at least two lamps loads.

A method according to on embodiment may include generating AC voltage and current and a striking voltage. The method of this embodiment may also include generating striking voltage and steady-state voltage for at least two lamp loads. The method of this embodiment may also include coupling at least two lamp loads in parallel. The method of this embodiment may also include coupling current balancing circuitry to the at least two lamp loads and providing, by the current balancing circuitry simultaneous striking voltage to the at least two lamps loads. The method of this embodiment may also include balancing, by the current balancing circuitry, AC current through the at least two lamp loads.

One apparatus embodiment may include current balancing circuitry coupled to a plurality of lamp loads and a transformer capable of generating, at least in part, AC voltage and current and a striking voltage. The current balancing circuitry may be capable of balancing AC current supplied by the transformer through the at least two lamp loads. The current balancing circuitry may also be capable of providing simultaneous striking voltage, supplied by the transformer, to the at least two lamps loads.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
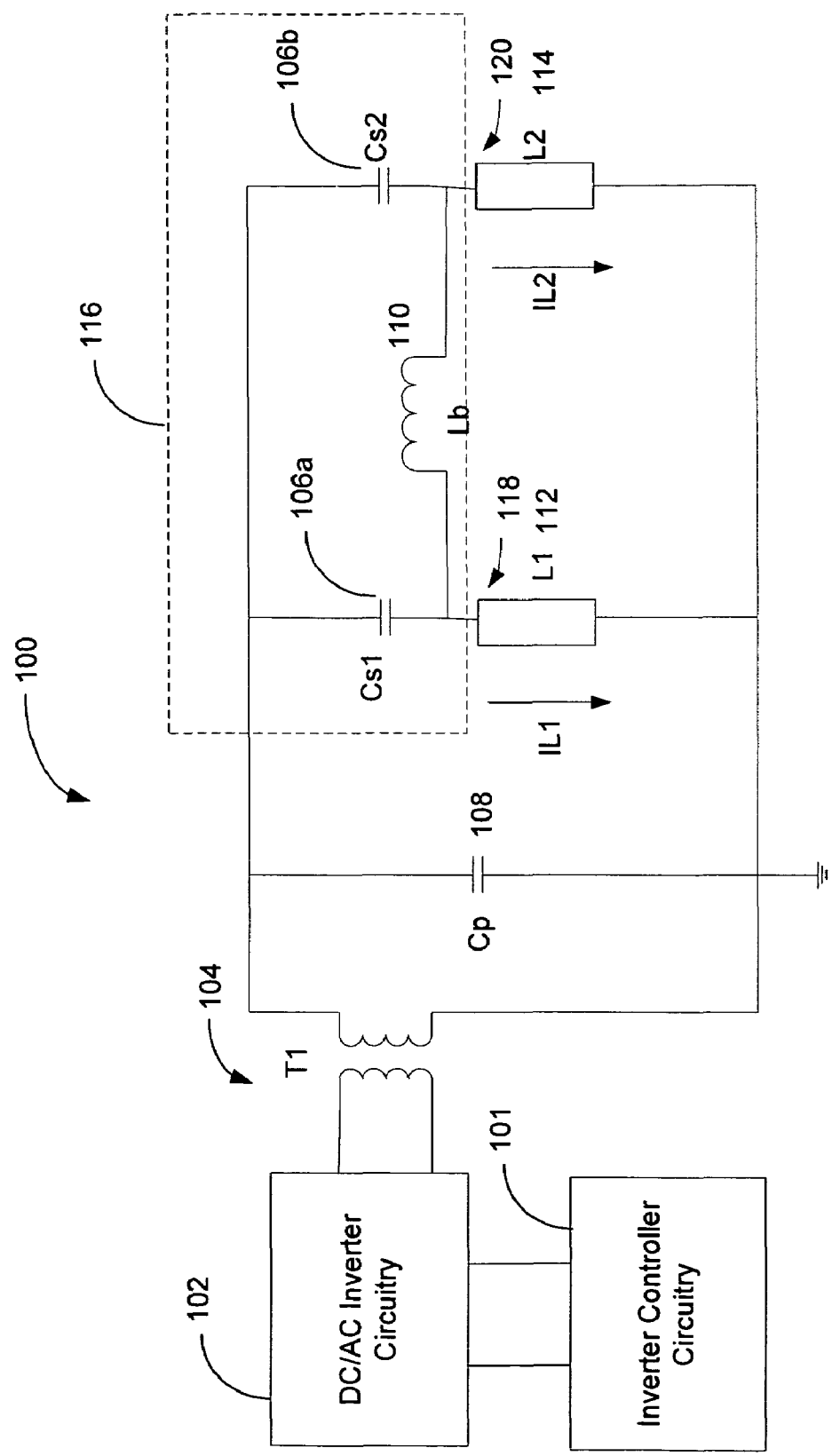
FIG. 1 illustrates one exemplary system embodiment of the claimed subject matter.

FIG. 1 illustrates one exemplary system embodiment 100 of the claimed subject matter. System 100, in this embodiment, may include inverter controller circuitry 101, DC/AC inverter circuitry 102, current balancing circuitry 116 and one or more loads 112, 114. In this embodiment, loads 112 and 114 comprise lamp loads, for example cold cathode fluorescent lamps, as may be used in a liquid crystal display (LCD) panel. DC/AC inverter circuitry 102 may comprise, for example, a plurality of switches (not shown) arranged in a full-bridge, half-bridge, push-pull, active clamp, and/or Class D topology and/or other conventional and/or custom inverter topology. Inverter controller circuitry 101 may control the switches of the inverter circuitry 102 to generate a rectangular AC signal from a DC source. System 100 may also comprise a transformer 104. Transformer 104 may receive the rectangular AC signal and, in conjunction with one or more resonant capacitors 108, generate a smooth sinusoidal (or quasi-sinusoidal) AC signal to supply power to the lamp loads 112 and 114. In this embodiment, current balancing circuitry 116 may be capable of balancing current supplied to each lamp load, in a manner described below.

As used in any embodiment herein, "circuitry" may comprise, for example, singly or in any combination, hardwired circuitry, programmable circuitry, state machine circuitry, and/or firmware that stores instructions executed by programmable circuitry. For ease of understanding, the drawings herein depict inverter controller circuitry 101, DC/AC inverter circuitry 102 and current balancing circuitry 116 as separate components. However, it should be understood that inverter controller circuitry 101, DC/AC inverter circuitry 102 and current balancing circuitry 116 may, in whole or in part, or collectively or individually, be comprised in one or more integrated circuits. As used in any embodiment herein, an "integrated circuit" means a semiconductor device and/or microelectronic device, such as, for example, a semiconductor integrated circuit chip.

The inverter controller circuitry 101 may be capable of controlling DC/AC inverter circuitry 102 to generate an AC voltage and current from a DC signal. The inverter controller circuitry 101 may also be capable of controlling the DC/AC inverter circuitry 102 to generate striking voltage and steady-state voltage for at least two lamp loads 112 and 114. Striking voltage may include, for example, sufficient voltage to ignite the lamp. If the lamp is a CCFL, for example, a striking voltage on the order of 1500 Volts may be used to ignite the lamp. Once struck, the lamp may require less voltage during steady-state operation. If the lamp is a CCFL, for example, a steady state voltage on the order of a few hundred volts may be used.

Current balancing circuitry 116 may include respective ballast capacitors 106a and 106b for each respective lamp load 112, 114. The lamp loads may be coupled in parallel with each other and to the transformer 104. Current balancing circuitry 116 may also include a balancing inductor 110 disposed between each lamp 112 and 114, for example, between the high voltage sides 118 and 120, respectively, of the lamps, and each respective ballast capacitors 106a and 106b. Ballast capacitors 106a and 106b and inductor 110 may operate to balance current through each lamp load IL1 and IL2. "Balance", as used in any embodiment herein with reference to the current in each lamp load, may be defined as approximately equal, or, alternatively, as a condition where the current in one lamp is a multiple of the current in another lamp load. Current balancing circuitry 116 may be capable of supplying lamp striking voltage to each lamp in the system 100 simultaneously. "Simultaneously", as used in any embodiment herein with reference to striking voltage, may mean that each lamp is provided striking voltage at the same time. Lamp striking voltage may last for several seconds, and the aforementioned definition of "simultaneously" means that at least a portion of the time intervals for the striking voltage for each lamp overlap (which does not necessarily mean that the time intervals overlap completely).

For example, the current in each lamp load may be balanced when the respective currents IL1 and Il2 are approximately equal. "Approximately equal", as used herein with reference to current, may be defined as within a selected and/or pre-defined tolerance and/or within a tolerance that may be defined by component values. In this embodiment, ballast capacitors 106a and 106b may be given a common value Cb, then according to Kirchhoff's voltage law, a proper current balance may be achieved at a certain operating frequency fo if the balancing inductor Lb 110 and the ballast capacitors Cb 106a and 106b are given values according to:

$$w^2 LbCb = 2; \text{ where } w = 2\pi fo$$

Since the inductor 110 is located on the high voltage sides (118 and 120) of the lamps 112 and 114, the safety and voltage ratings of the inductor 110 may be considered.

Figure 2:
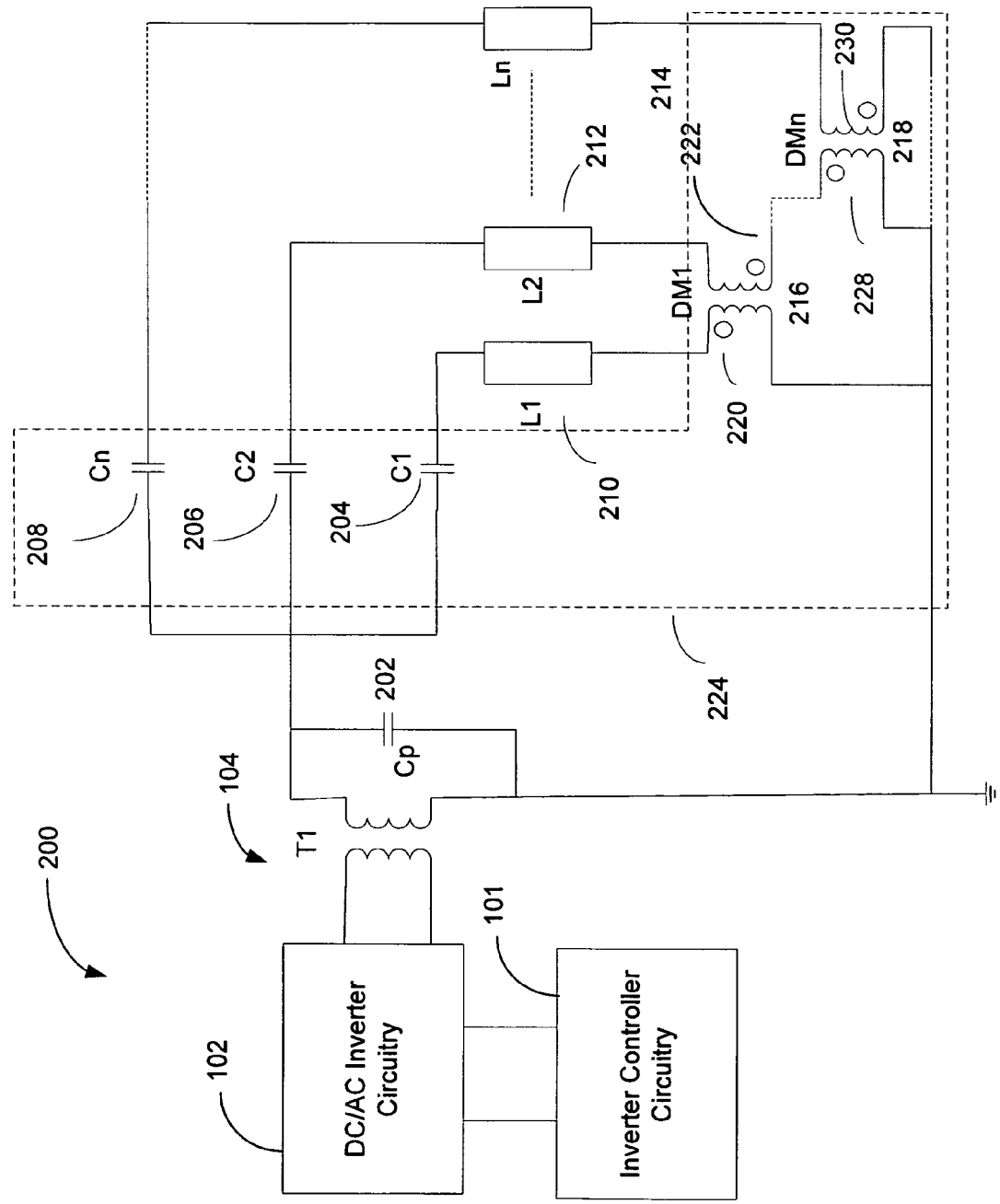
FIG. 2 illustrates another exemplary system embodiment of the claimed subject matter.

FIG. 2 illustrates another exemplary system embodiment 200 of the claimed subject matter. System 200 is similar to system 100, except that the current balancing circuitry 224 comprises differential mode inductor circuitry 216, . . . , 218 and this embodiment is generalized for n-number of lamp loads, i.e., lamps L1 (210), L2 (212), . . . , Ln(214).

The low voltage terminals of the n lamps 210, 212, 214 may be connected by n−1 differential mode inductors 216, 218. Thus, for example, if system 200 includes 3 lamps, than system 200 may also include two differential mode inductors 216 and 218. Each differential mode inductor may include a primary winding 220 and 228 and a secondary winding 222 and 230. Each lamp load 210, 212, . . . , 214 may be coupled to a respective primary winding 220 or 228 or a respective secondary winding 222 or 230. In this embodiment, each differential mode inductor 216, . . . , 218 may operate as 1-1 current transformers, meaning the current through the primary windings is approximately equal to the current through the secondary windings.

The high voltage side of each lamp may be coupled in series to respective ballast capacitors 204, 206, . . . , 208. Each lamp and ballast capacitor may be coupled in parallel to each other and to transformer 104.

The inductance values for the differential mode inductors 216, 218 may be calculated using Kirchhoff's laws. The differential mode inductors 216, 218 may be arranged so that the low voltage terminal of lamp L1 210 is connected to the primary winding of differential mode inductor DM1 216, the low voltage terminal of lamp L2 212 is connected to the secondary winding of differential mode inductor DM1 216, the low voltage terminal of lamp Ln 214 is connected to the secondary winding of differential mode inductor DMn 218. The differential mode inductors 216, 218 may be further arranged so the secondary winding of differential mode inductor DM1 216 is in series with the primary winding of differential mode inductor DMn 218.

As with the previous embodiment, current balancing circuitry 224 coupled to the lamp loads may operate to balance current through each lamp load. Also, current balancing circuitry 224 may be capable of supplying lamp striking voltage to each lamp in the system 200 simultaneously.

Figure 3:
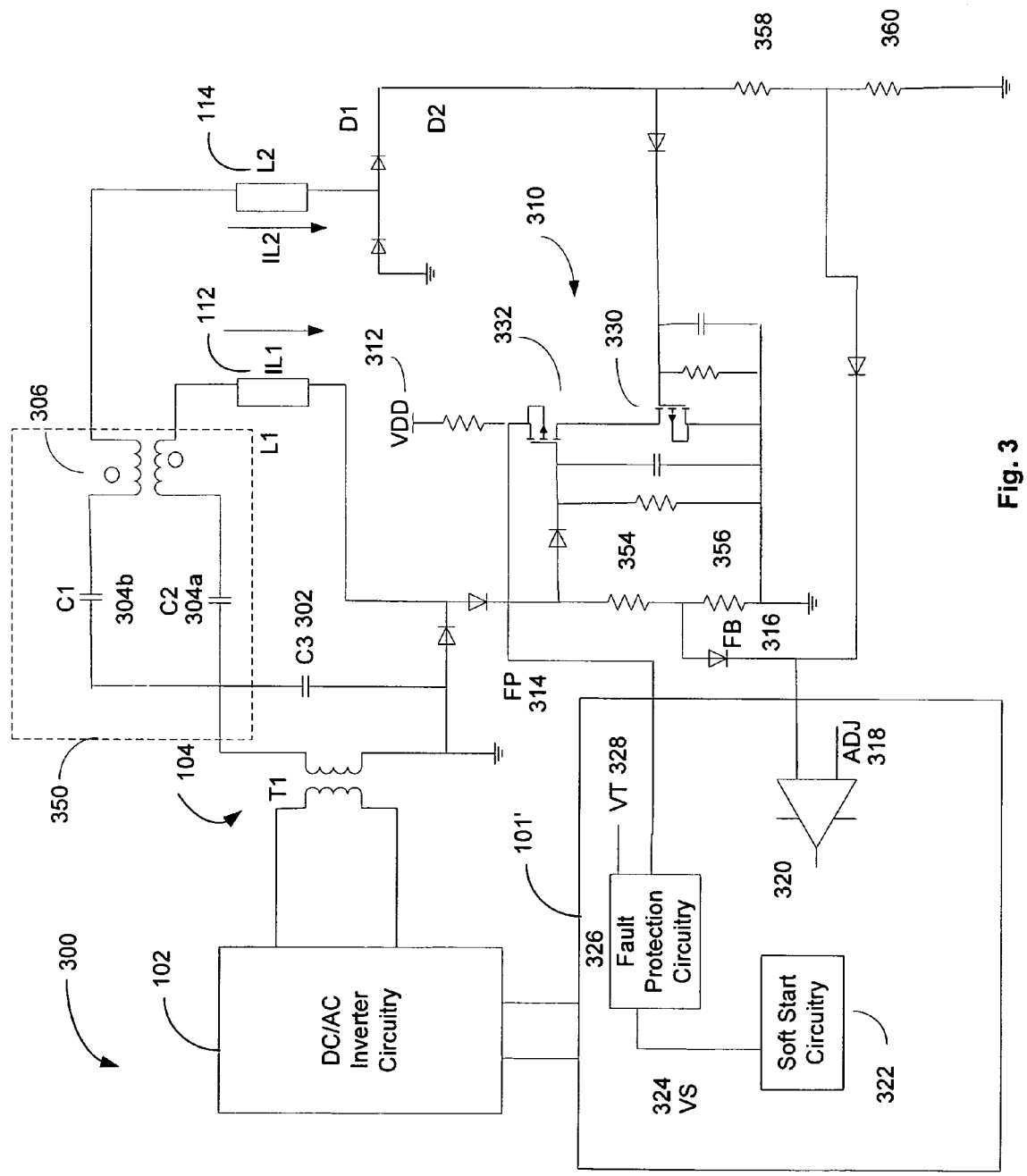
FIG. 3 illustrates another exemplary system embodiment of the claimed subject matter.

FIG. 3 illustrates another exemplary embodiment 300 of the claimed subject matter. This particular embodiment may include inverter controller circuitry 101', DC/AC inverter circuitry 102, current balancing circuitry 350, and one or more loads 112, 114. In this embodiment, loads 112 and 114 comprise lamp loads, for example cold cathode fluorescent lamps (CCFLs), as may be used in a liquid crystal display (LCD) panel. DC/AC inverter circuitry 102 may comprise, for example, a plurality of switches (not shown) arranged in a full-bridge, half-bridge, push-pull, active clamp, and/or Class D topology and/or other conventional and/or custom inverter topology. Inverter controller circuitry 101' may control the switches of the inverter circuitry 102 to generate a rectangular AC signal from a DC source.

System 300 may also comprise transformer 104. Transformer 104 may receive the rectangular AC signal and, in conjunction with one or more resonant capacitors 302, generate a smooth sinusoidal (or quasi-sinusoidal) AC signal to supply power to the lamp loads 112 and 114. In this embodiment, current balancing circuitry 350 may be capable of balancing current supplied to each lamp load, in a manner described below.

The inverter controller circuitry 101' may have all of the capabilities of the inverter controller circuitry 101' described above with reference to FIGS. 1 and 2, and, in this embodiment may also comprise soft start circuitry 322, fault protection circuitry 326 and a feedback comparator 320. During initial power on, after reset, and/or at other time periods, soft start circuitry 322 may be capable of controlling the switches 102 of the DC/AC inverter circuitry to generate a nominal or minimal current value applied to transformer T1 104. Soft start circuitry 322 may also be capable of ramping up power delivered to the CCFL loads, based on, for example, a user-defined and/or programmable interval.

The soft start circuitry 322 may increase the signal VS 324 which may cause the inverter controller circuitry 101' to control the DC/AC inverter circuitry 102. If the signal VS 324 reaches a threshold voltage VT 328, the soft start circuitry 322 may enable the fault protection circuitry 326. The fault protection circuitry 326 may also be enabled by a fault protection signal FP 314. Fault protection circuitry 326 may control switches 102 to reduce, minimize, and/or shut-off power delivered to one or more lamp loads (for example, as may be desirable if an open-lamp condition is detected). The inverter controller circuitry 101' may control the DC/AC inverter circuitry 102 based on, at least in part, lamp current feedback information.

To that end, inverter controller circuitry 101' may also include a feedback comparator 320. The feedback comparator 320 may compare lamp current from one or more loads 112, 114 to a reference signal ADJ 318, for example, a signal proportional to the brightness setting in a liquid crystal display (LCD) panel. Inverter controller circuitry 101' may also receive voltage feedback indicative of the voltage across one or more lamp loads, and may also control switches 102 based on, at least in part, voltage feedback information. Lamp current information for lamp 112 may be generated by voltage divider circuitry, for example a voltage divider comprising resistor 354 and 356. Voltage divider resistors 354 and 356 may generate a current feedback signal indicative of, or proportional to, the current in lamp 112. Similarly, lamp current information for lamp 114 may be generated by voltage divider circuitry, for example a voltage divider comprising resistor 358 and 360. Voltage divider resistors 358 and 360 may generate a current feedback signal indicative of, or proportional to, the current in lamp 114.

Current balancing circuitry 350 may include respective ballast capacitors 304a and 304b for each respective lamp load 112, 114. Current balancing circuitry may also include differential mode inductor circuitry 306 electrically coupled to the high voltage side of the lamp load. The ballast capacitors 304a and 304b and the differential mode inductor 306 may operate to balance the current, as defined above, through each lamp load IL1 and IL2. Additionally, current balancing circuitry may be capable of supplying lamp striking voltage to each lamp in the system 300 simultaneously, as may defined above.

In this particular embodiment, ballast capacitors 304a and 304b may be given a common value C. The inductance of the primary and secondary windings of the differential mode inductor 306 may be given a common value L and contain a mutual inductance M. The lamp loads may be replaced with loads RL1 and RL2 for the purposes of calculations and the inductance of the differential mode inductor may be found using Kirchhoff's Laws:

$$RL1^2 - RL2^2 = (4L/C)*(1-K), \text{ where } K=M/L.$$

For the purpose of calculation, the values of RL1 and RL2 may be assumed to be a worst case scenario, for example 20% apart with values of 120 KΩ and 100 KΩ respectively, and the inductance L may be calculated from those assumed values. When the RL1/RL2 differential is near the assumed differential, the current balancing circuitry 350 will correct the current imbalance. When the RL1/RL2 differential is near zero, the current will be naturally balanced because there will be no lamp impedance differential. The range may be picked realistically because the current balance may suffer when the RL1/RL2 differential is between the assumed value and zero.

When the above formula is followed, the differential mode inductor 306 may act as a 1-1 current transformer and balance the current, IL1 and IL2, flowing to each lamp 112 and 114, respectively. However, it is equally contemplated herein that inductor 306 may be configured to operate in other modes, for example, a m to n current transformer, where m does not equal n. The ballast capacitors 304a and 304b and the inductance of the primary and secondary windings of the differential mode conductor do not have to be equal for the differential mode inductor 306 to balance the lamp currents IL1 and IL2, and may have unequal capacitance and inductance values respectively. If the values are unequal, the differential mode inductor 306 may be chosen according to Kirchhoff's laws. Since the differential inductor 306 is located on the high voltage side of the lamp loads 112 and 114, the safety and voltage ratings of the differential mode inductor 306 may be considered.

The fault protection signal generating circuitry 310 may generate a fault protection signal FP 314 that may be used by the inverter controller circuitry 101'. The fault protection generating circuitry 310 may comprise switches 330 and 332 that may process the output voltages of each individual lamp 112, 114. In this embodiment, there may be a transistor 332, 330 for each individual lamp 112, 114 that may be gated by the output voltage of respective lamp 112, 114 output voltage. The transistors 332, 330 may be connected in series in such a manner that when all transistors 332, 330 are turned on the fault protection signal FP 314 is pulled to ground. If one of the lamps 112, 114 stops producing voltage, the associated transistor 332, 330 may be turned off causing the fault protection signal 314 to be pulled to approximately VDD 312. This may operate to trigger the fault protection circuitry 326 in the inverter controller 101' to reduce and/or shut off power delivered to the lamp loads (via switches 102).

Figure 4:
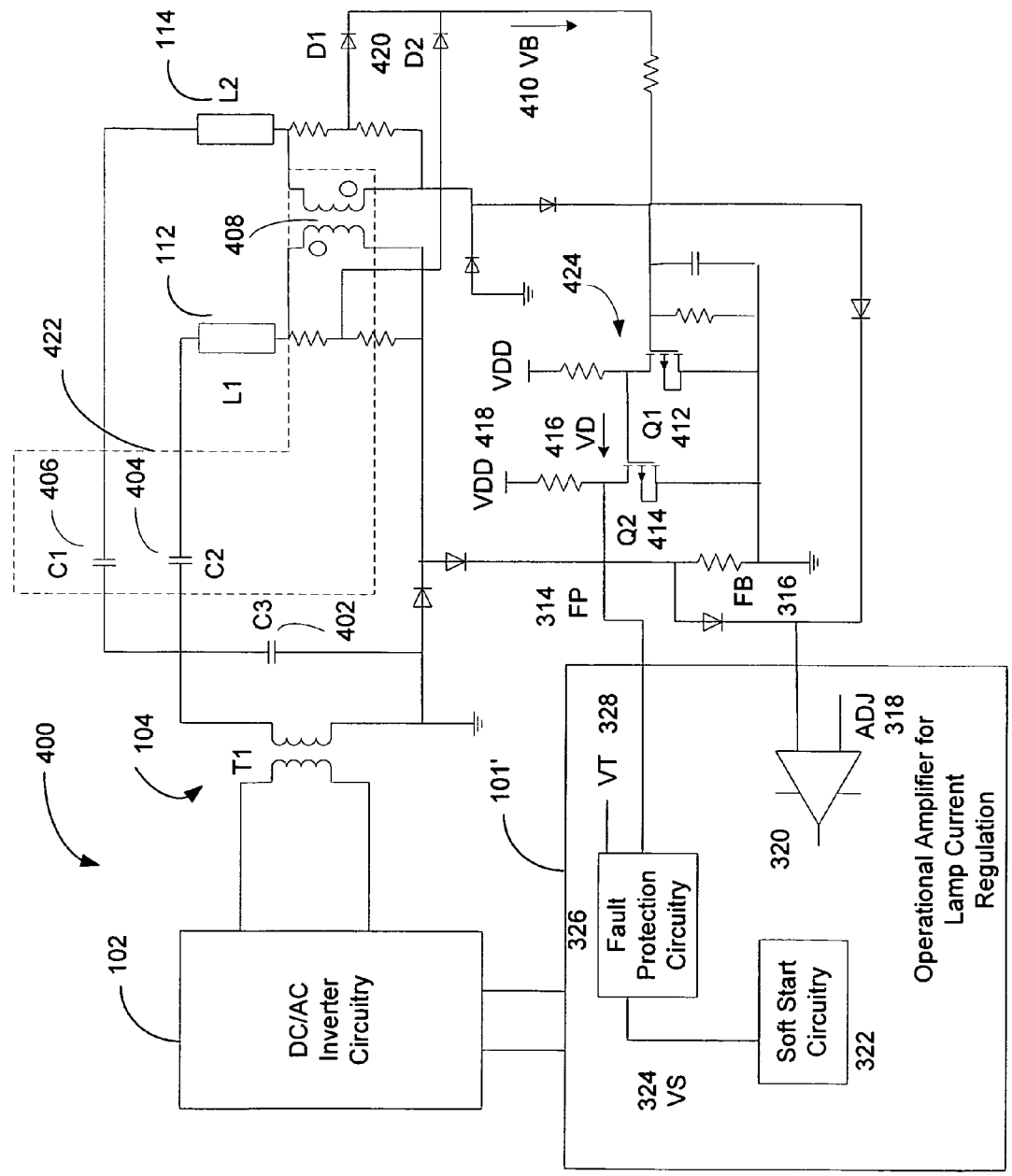
FIG. 4 illustrates another exemplary system embodiment of the claimed subject matter.

FIG. 4 illustrates another exemplary embodiment 400 for the claimed subject matter. This particular embodiment may include inverter controller circuitry 101', DC/AC inverter circuitry 102, current balancing circuitry 422, and one or more loads 112 and 114. The inverter controller circuitry 101', DC/AC inverter circuitry 102, and current balancing circuitry 422 may have similar capabilities and configurations to their respective counterparts in system 300 except that the current balancing circuitry 422 in system 400 may comprise a differential mode inductor 408 located on the low voltage side of the lamp loads. Shifting the differential mode inductor 408 to the low voltage side of the lamp may reduce the safety hazards created by providing the differential mode inductor 408 with too much voltage, while still maintaining a current balance between the respective lamps.

The fault protection signal generating circuitry 424 may generate a fault protection signal FP 314 that may be used by the inverter controller circuitry 101'. The fault protection signal generating circuitry 424 may comprise transistor logic 412 and 414 that processes the output voltages of each individual lamp 112 and 114. The output voltages of each lamp may be sensed and OR-ed together, by diodes D1 and D2 420, to create a signal VB 410. The signal VB 410 may be used to gate switch Q1 412, controlling the signal VD 416. The signal VD 416 controls switch Q2 414, thereby controlling the fault protection signal FP314. When the lamps 112 and 114 are functioning in a normal manner, the signal VB 410 may be small and unable to trigger the switch Q1 412. If the switch Q1 412 is not turned on, the signal VD 416 may be pulled to approximately VDD 418. If VD 416 is large, the switch Q2 414 may be turned on, pulling the fault protection signal 314 to ground. However, if the lamps 112 and 114 are removed or malfunctioning, VB 410 may be large and may enable the switch Q1 412. If the switch Q1 412 is enabled, the signal VD 416 may be pulled to ground, the switch Q2 414 may be turned off. If the switch Q2 414 is turned off, then the fault protection signal 316 may be approximately VDD 418. If the fault protection signal output 314 is high, then the fault protection circuitry 326 may be enabled.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

The invention claimed is:

1. A driving circuit for driving at least two lamp loads coupled to each other in parallel, comprising:
    a transformer configured to generate, at least in part, AC voltage and current and applying said AC voltage and said current to said at least two lamp loads;
    an inverter circuit coupled to said transformer;
    a current balancing circuit coupled to said at least two lamp loads and configured to balance said currents supplied to said at least two lamp loads;
    an inverter controller coupled to said inverter circuit for controlling said inverter circuit so as to generate said AC voltage and said current; and
    a fault protection signal generating circuit configured to detect an open lamp condition of said at least two lamp loads, wherein said inverter controller reduces power supplied to said at least two lamp loads in response to said open lamp condition detected by said fault protection signal generating circuit.

2. The driving circuit of claim 1, wherein each of said at least two lamp loads comprises a cold cathode fluorescent lamp (CCFL).

3. The driving circuit of claim 1, wherein said current balancing circuit comprises a differential mode inductor comprising a primary winding and a secondary winding respectively coupled to said at least two lamp loads for balancing said currents supplied to said at least two lamp loads.

4. The driving circuit of claim 3, wherein said fault protection signal generating circuit detects voltages across said primary winding and said secondary winding of said differential mode inductor, and wherein said open lamp condition is detected when one of said voltages across said primary winding and said secondary winding is higher than a predetermined voltage.

5. The driving circuit of claim 3, wherein said differential mode inductor locates on a low voltage side of said at least two lamp loads.

6. The driving circuit of claim 1, wherein said inverter controller further comprises a soft start circuitry configured to control said inverter circuit to ramp up current applied to said transformer and to generate a minimal current value applied to said transformer.

7. The driving circuit of claim 1, further comprising:
    a feedback circuit for generating a current feedback signal indicative of a current flowing through one of said at least two lamp loads.

8. The driving circuit of claim 7, further comprising:
    a feedback comparator configured to compare said current feedback signal to a predetermined signal.

9. The driving circuit of claim 7, wherein said feedback circuit comprises a resistor coupled to said one of said at least two lamp loads for generating said current feedback signal.

10. A method for driving at least two lamp loads, comprising:
    receiving an external DC power;
    converting said DC power to an AC power;
    generating striking voltage for said at least two lamp loads using a transformer;
    generating operating AC voltage for said at least two lamp loads using said transformer;
    balancing currents flowing through said at least two lamp loads using a differential mode inductor comprising a primary winding and a secondary winding respectively coupled to said at least two lamp loads;
    detecting voltages across said primary winding and said secondary winding of said differential mode inductor; and
    reducing power supplied to said at least two lamp loads if one of said voltages across said primary winding and said secondary winding is higher than a predetermined voltage.

11. The method of claim 10, wherein each of said at least two lamp loads comprises a cold cathode fluorescent lamp (CCFL).

12. The method of claim 10, further comprising:
    coupling said primary winding of said differential mode inductor in series to one of said at least two lamp loads; and
    coupling said secondary winding of said differential mode inductor in series to another of said at least two lamp loads so as to balance said currents flowing through said at least two lamp loads.

13. The method of claim 10, wherein said differential mode inductor locates on a low voltage side of said at least two lamp loads.

14. The method of claim 10, further comprising:
    generating a current feedback signal indicative of a current flowing through one of said at least two lamp loads.

15. The method of claim 14, further comprising:
    comparing said current feedback signal to a predetermined signal so as to control said power supplied to said at least two lamp loads.

16. The method of claim 14, wherein said current feedback is generated by a resistor.

* * * * *